United States Patent Office 2,921,134
Patented Jan. 12, 1960

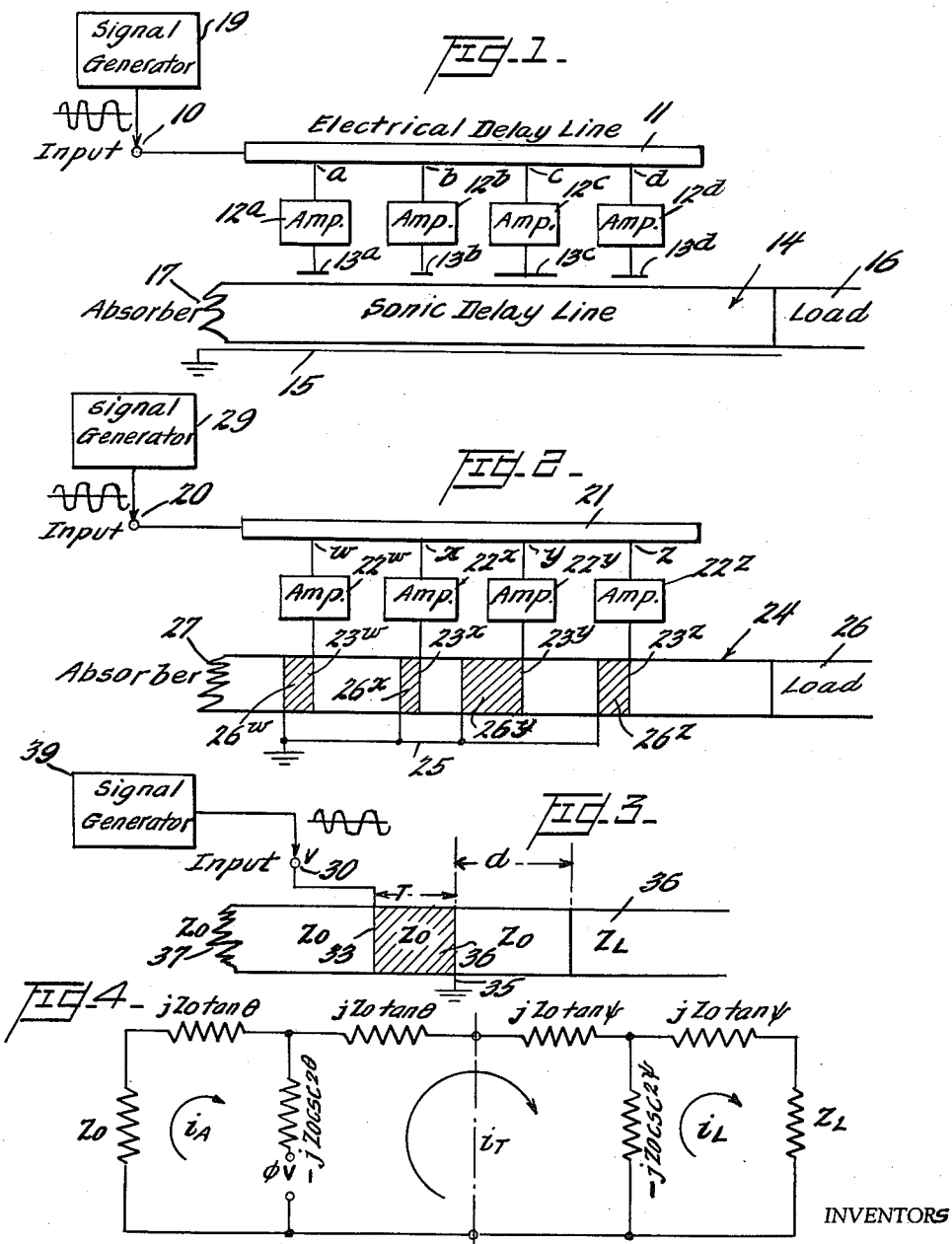
Jan. 12, 1960 — M. GREENSPAN ET AL — 2,921,134
ELECTRICAL-SONIC TRANSDUCERS
Filed Nov. 21, 1957
INVENTORS
Martin Greenspan
Raymond M. Wilmotte,
BY Paris and Haskell
ATTORNEYS

2,921,134

ELECTRICAL-SONIC TRANSDUCERS

Martin Greenspan, Silver Spring, Md., and Raymond M. Wilmotte, Miami, Fla.

Application November 21, 1957, Serial No. 697,971

11 Claims. (Cl. 179—1)

The present invention pertains to transducers, and may be further characterized as relating to the field of interconverting electrical and sonic energy. The term "sonic energy" is used herein in its broadest sense, and does not indicate frequencies restricted to the audible range, but rather is intended to describe the form of the energy concerned. In fact, it is contemplated that the present invention will find its greatest utility in the field of ultrasonics.

In accordance with one aspect of the present invention, an electrical-sonic transducer, or transducer for interconverting electrical and sonic energy, is provided, wherein a plurality of discrete transducing elements interconnect an electrical energy carrying line with a sonic energy carrying line. For example, the electrical line may be an electrical delay line, while the sonic line may be any material capable of carrying sonic energy therealong, such as a piezoelectric material. The discrete electrical-sonic transducer elements, which may for example be magnetostrictive or piezoelectric in character, are individually sonically coupled to the sonic line and individually electrically coupled to the electrical line at spaced intervals along said lines. The successive transducer coupling points in the electrical line are spaced from each other, in terms of electrical energy delay time along the electrical line, by amounts substantially equal to the corresponding transducer coupling points in the sonic line, in terms of sonic energy delay time along the sonic line. In other words, the couplings are so located on the respective lines that upon an input signal being applied to one line, when it reaches the first transducer coupling it is coupled into the other line, and thereafter the two signals travelling on their respective lines reach each corresponding coupling point substantially in phase. This general character of transducer is herein identified as a distributed transducer. Its overall object is to convert a signal of one form of energy to the other, and the resultant output is applied to a load responsive to the form of the converted energy.

A distributed transducer of the general character above described is disclosed in U.S. Patent 2,702,472 to Jacob Rabinow. In the distributed transducer there described, the individual transducers are all equal in dimension, and the principal purpose of that distributed transducer is to effect a substantial increase in the power output at the load above that obtainable with a single transducer element. It should be observed that in the distributed transducer described in said Rabinow patent, the frequency response of the system at the load is the same as that had with but a single transducer element of the chosen dimension, namely the power absorbed by the load is proportional to the square of the frequency (amplitude flat with frequency). In accordance with the present invention, however, the distributed transducer is provided with transducer elements having different dimensions, and preferably operated near their resonant frequencies. By this means a great variety of frequency response characteristics at the load is obtainable, and of particular interest is the fact that by this teaching a system of transducer element relationships is available whereby a substantially flat power response over a broad band of frequencies is obtainable with but a relatively few transducer elements having appropriately chosen dimension relationships, as will be more fully described hereinafter.

In accordance with a further aspect of the present invention, an electrical-sonic transducer is provided wherein at least half the power introduced in the output line is delivered to the load. We have discovered that the proportion of power delivered to the load in the output line is a function of the spacing of the discrete transducer element from the load end of the line, and such spacing is related to the frequency of applied signal. As will be more particularly described hereinafter, the spacing of the transducer element from the load can be chosen to obtain in the load at least one half the power in the output line.

It is accordingly one object of the present invention to provide a distributed transducer affording a great variety of frequency-response characteristics.

Another object of the present invention is to provide a distributed transducer for interconverting electrical and sonic energy affording a great variety of frequency-response characteristics.

A further specific object of the present invention is to provide a distributed transducer as above indicated providing a flat power response over a broad band of frequencies.

Still another object of the present invention is to provide a transducer for interconverting sonic and electrical energy wherein at least one half the power in the output end of the transducer is applied to the load.

Other objects and advantages of the present invention will become apparent to those skilled in the art from a consideration of the following detailed description thereof had in conjunction with the accompanying drawings, wherein:

Fig. 1 is a schematic representation of a distributed transducer embodying one form of the present invention;

Fig. 2 is a schematic representation of a distributed transducer embodying a second form of the present invention;

Fig. 3 is a schematic representation of a single element transducer utilized to illustrate the principles of the invention embodied in Figs. 1 and 2, and also to illustrate an additional feature of the present invention; and Fig. 4 is an equivalent circuit diagram of the transducer shown in Fig. 3.

For the purpose of illustration in the following specific description of the invention, the input to the transducer is considered to be electrical into the electrical line, and the output is considered to be sonic into a load placed at one end of the sonic line. However, it should be understood that the invention is equally applicable to the inverse situation where the input is sonic energy applied to the load end of the sonic line, delivering an electrical output at the input end of the electrical line. Also, the individual transducer elements are illustrated as piezoelectric means, however it should be understood that magneto-strictive means or other electrical-sonic interconverting means may be employed.

In Figs. 1 and 2 two basic embodiments of the present distributed transducer are illustrated. In Fig. 1 the invention is illustrated as a distributed length expander, while in Fig. 2 the invention is shown as a corresponding distributed thickness expander. First, considering the form of the invention illustrated in Fig. 1, an electrical input from any desired source or generator 19, such as an oscillator, a voice transmitter, or the like, is had at 10, and from there applied to any suitable and conventional electrical delay line 11, as are well known in the art. The delay line is tapped at a plurality of points $a$, $b$, $c$, and $d$ and the outputs therefrom coupled into amplifiers 12$a$, 12$b$, 12$c$, and 12$d$. Associated with the electrical line 11 is a sonic line 14, which may conveniently be formed from piezoelectric material, having a sonic energy absorber 17 at one end and a sonic energy output load 16 at the opposite end. A number of transducer terminals 13$a$, 13$b$, 13$c$, and 13$d$ are positioned along the length of the line 14, cooperating with a common ground terminal 15 and the piezoelectric material 14, to form a plurality of spaced individual piezoelectric transducer elements. The equivalent of the foregoing sonic line could be formed of course as a composite by using a plurality of separate piezoelectric transducers interconnected by any inactive material capable of functioning as a sonic line, and whose characteristic impedance is the same as the piezoelectric material in the transducers. To complete the present distributed transducer, the amplifiers 12$a$, 12$b$, 12$c$, and 12$d$ are coupled to the respective transducer electrodes 13$a$, 13$b$, 13$c$ and 13$d$. The electrodes 13$a$, 13$b$, 13$c$, and 13$d$ have, as shown, different length dimensions along the line 14 resulting in different length dimensions for the discreet transducer elements defined by said electrodes.

In Fig. 2, the invention is shown in the form of a distributed thickness expander. As in the preceding embodiment, an electrical input from generator 29, or the like, is applied at 20 and fed to an electrical delay line 21. A sonic line 24 having an absorber 27 at one end and a load 26 at its other end, contains a plurality of individual piezoelectric transducer elements 26$w$, 26$x$, 26$y$, and 26$z$. The transducer elements are shown cross-hatched. In this embodiment these transducer elements are inserted in the sonic line lengthwise thereof, rather than across the line as in Fig. 1. Accordingly, the dimensions of each transducer element are shown to differ in their thickness dimension, rather than in the length dimension as in Fig. 1. In the present embodiment, as in Fig. 1, the sonic line between the transducer elements, and to the load 26 and absorber 27, i.e., the uncross-hatched areas, may be formed of piezoelectric material, in which case the polarity of the uncross-hatched area elements are all opposite to the polarity of the cross-hatched transducer elements, or the uncross-hatched areas may be formed of an inactive material having the same characteristic impedance as the piezoelectric material. To complete the present distributed transducer system by interconnecting or coupling the electrical line 21 with the sonic line 24, the electrical delay line 21 is tapped at a plurality of points $w$, $x$, $y$, and $z$, and the electrical outputs therefrom are coupled through the respective amplifiers 22$w$, 22$x$, 22$y$, and 22$z$ to electrodes 23$w$, 23$x$, 23$y$, and 23$z$, respectively, of piezoelectric transducers 26$w$, 26$x$, 26$y$, and 26$z$. The opposite electrodes of the transducers are coupled to ground at 25.

In both of the foregoing embodiments of the invention, the spacing of the individual transducer elements in the sonic line and the spacing of the corresponding taps in the electrical line are selected, so that the time delay in sonic energy travel between successive transducer elements in the sonic line is substantially equal to the time delay in electrical energy travel between successive corresponding taps in the electrical delay line. Accordingly, in Fig. 1 for example, an electrical input signal applied at 10 enters the electrical delay line 11 and travels therealong. When it reaches tap $a$, the signal is passed by amplifier 12$a$ to piezoelectric transducer electrode 13$a$, and coupled into the sonic line 14. The resultant sonic signal travels from transducer 13$a$ both to the left and right along line 14. The energy traveling to the left is eventually absorbed in absorber 17. As the sonic energy travels to the right toward load 16, the original electrical input signal is traveling to the right along line 11. The time delay for electrical energy along line 11 between taps $a$, $b$, $c$, and $d$ is so chosen as to equal substantially the time delay for sonic energy along line 14 between transducer elements 13$a$, 13$b$, 13$c$, and 13$d$. Accordingly, the electrical signals on delay line 11 reach tap $b$ substantially in phase with the sonic signals reaching transducer element 13$b$, and the same in phase relationship between the two signal trains continues for tap $c$ and transducer element 13$c$, and tap $d$ and transducer element 13$d$. Finally, the sonic energy on line 14 is coupled into load 16 as the output of the distributed transducer. The present description of operation of the distributed transducer of Fig. 1 is equally applicable to the embodiment of Fig. 2. Since the correspondence therebetween is readily apparent, repetition of the operation with specific reference to Fig. 2 is deemed unnecessary.

It is next desired to consider a summary mathematical analysis of the output characteristics of the distributed transducer of the present invention. To facilitate an understanding of this analysis and illustrate the significance of the symbols there employed, reference is had to Figs. 3 and 4, Fig. 3 showing a single element transducer in the thickness expander form of the invention, and Fig. 4 being an equivalent circuit diagram of the transducer system of Fig. 3. In Fig. 3 the electrical input from generator or the like 39 is at 30. Since there is only one active or piezoelectric transducer element 36 here employed, an electrical delay line is not needed. The input feeds to one electrode 33 of the transducer element 36, whose second electrode is coupled to ground at 35. The element 36 is located in a sonic line 34 similar to lines 14 and 24 in Figs. 1 and 2, terminating at one end in a sonic absorber 37 and at the other end in a sonic load 36. As depicted in the drawing, the value of the input signal is denoted V, the thickness of the active element or transducer element 36 is T, whose right end is a distance $d$ from the load 36. The characteristic impedance of the active element 36, the absorber 37, and the inactive portions of the sonic line are all denoted as $Z_o$. The impedance of the load 36 is denoted $Z_L$. In the equivalent circuit of Fig. 4, that part to the right of the dashed line is the equivalent T network (see Terman, Radio Engineers' Handbook, p. 195, McGraw-Hill, 1943) of the inactive material between the transducer element and the load, with $$\psi = \frac{\omega d}{2c} \qquad (1)$$

in which $c$ is the speed of sound in the material and $\omega$ is the angular frequency. The part to the left of the dashed line represents the active element (see W. P. Mason, Electromechanical Transducers and Wave Filters, p. 230, Van Nostrand, 1954), with $$\theta = \frac{\omega T}{2c} \qquad (2)$$

The input $\phi$V is the driving voltage V referred to the mechanical side, $\phi$ being the "turns ratio" of the fictive electromechanical transformer. For a thickness expander $$\phi = \frac{dA}{s^E T} \qquad (3)$$

and for a length expander $$\phi = \frac{dw}{s^E} \qquad (4)$$

In Equations 3 and 4, $d$ is the piezoelectric modulus appropriate to the cut, $s^E$ is the isagric compliance appropriate to the types of motion, A is cross section, T is thickness parallel to motion, and $w$ is width perpendicular to field and to motion. The static capacitance of the transducer is considered absorbed in the delay line which drives the transducer, and the source impedance is taken as zero.

From the foregoing it can be shown that the load current (particle velocity) $i_L$ is $$i_L = \frac{2j\phi V}{Z_0 + Z_L} \sin \theta e^{-j(\theta + 2\psi)} \quad (5)$$

For Equation 5 it is observed that:

(1) For any load $Z_L$, the load current $i_L$ is independent of the length $d$ of the inactive part of the transducer;

(2) For any fixed load, the magnitude of the load current $i_L$ is proportional to $$\sin \theta = \sin \frac{\omega T}{2c}$$

see Equation 2, so that the bandwidth is independent of the load;

(3) The phase of the load current varies with frequency in a manner independent of the load, the phase depending only on $$\theta + 2\psi = \frac{\omega}{c}\left(\frac{T}{2} + d\right) \quad (6)$$

that is, on the distance from the center of the active element to the load, and on frequency.

The foregoing mathematical analysis of a single active element thickness type expander can be applied to a multi-element thickness expander. In the case of a two-element thickness expander, one element of thickness $T_1$ and distance $d_1$ from the load, and a second element of thickness $T_2$ and distance $d_2$ from the load, with $V_1$ and $V_2$ denoting the driving voltages, from Equation 5 it can be derived that $$i_L = \frac{2j}{Z_0 + Z_L} e^{-j(\theta_1 + 2\psi_1)}\left(\phi_1 V_1 \sin \theta_1 + \phi_2 V_2 \sin \theta_2 e^{j\frac{\omega s}{c}}\right) \quad (7)$$

in which $$s = d_1 - d_2 + \frac{T_1 - T_2}{2}$$

see Equation 6, is the center-to-center distance between the active elements. With $V_2$ delayed relative to $V_1$ by the time $$\frac{s}{c}$$

the phase of $V_2$ relative to $V_1$ is $$e^{-j\frac{\omega s}{c}}$$

and Equation 7 becomes $$i_L = \frac{2j}{Z_0 + Z_L} e^{-j(\theta_1 + 2\psi_1)}(\phi_1 |V_1| \sin \theta_1 + \phi_2 |V_2| \sin \theta_2) \quad (8)$$

from which, considering Equation 2, $$|i_L| = \frac{2}{Z_0 + Z_L}\left(\phi_1 |V_1| \sin \frac{\omega T_1}{2c} + \phi_2 |V_2| \sin \frac{\omega T_2}{2c}\right) \quad (9)$$

Equation 9 is readily extended to a transducer of any number $n$ of elements, giving $$|i_L| = \frac{2}{Z_0 + Z_L} \sum_{i=1}^{n} \phi_i |V_i| \sin \frac{\omega T_i}{2c} \quad (10)$$

Although derived with specific reference to a thickness expander, it is apparent that Equation 10 is equally applicable to a length expander, in which case T denotes length instead of thickness. If the thicknesses (or lengths) $T_i$ in Equation 10 are integral multiples of the smallest length $T_1$, Equation 10 is a Fourier's sine series for $|i_L|$, so that a wide variety of response curves can be synthesized by suitable choice of $|V_i|$. The constants $\phi_i$ are not disposable. For the length expander of Fig. 1, they are all equal, see Equation 4, and for the thickness expander of Fig. 2, they are inversely proportional to thickness, see equation 3.

If Equation 10 is applied to a conventional distributed transducer wherein all the transducer elements possess the same dimensions, as in the case of the distributed transducer described in the aforementioned patent to Jacob Rabinow, it will be seen that the power response is restricted to being proportional to the square of the frequency (amplitude is flat with frequency). When the individual transducers are small relative to the sonic energy wavelengths, $$\frac{\omega T_i}{2c} = \frac{\omega T}{2c} \ll 1$$

for all $i$, so that $$\sin\left(\frac{\omega T_i}{2c}\right) \approx \frac{\omega T}{2c}$$

and Equation 10 becomes, if $|V_i| = |V|$ and $\phi_i = \phi$, for all $i$ $$|i_L| = \frac{2n}{Z_0 + Z_L} \phi |V| \frac{\omega T}{2c} = \frac{\phi |V|}{Z_0 + Z_L} \frac{\omega l}{c} \quad (11)$$

$l$ being the total active length. Thus, the power response is proportional to the square of the frequency (the amplitude is flat with frequency) so long as $$T \ll \frac{\lambda}{\pi}$$

where $\lambda$ is the wavelength of sonic energy in the transducer material. The load current for an $n$-element transducer is $n$ times as great (the power output is $n^2$ times as great) as from a single-element transducer.

In the case of the instant invention, however, which is concerned with distributed transducers having transducer elements of different dimensions in the system, the power response with frequency possibilities are numerous and varied. Of particular interest is the specific example where the power response with frequency is made flat. In the case of a thickness expander, if one makes $T_i = iT$ ($i$ odd), that is:

$$T_1 = T, T_2 = 0, T_3 = 3T, \text{ etc.}$$

substituting Equation 3 in Equation 12, and if $|V_i| = |V|$, then $$|i_L| = \frac{|2V|}{Z_0 + Z_L} \frac{dA}{s^E T} \sum_{i=1,3,\ldots}^{n} \frac{1}{i} \sin \frac{i\omega T}{2c} \quad (12)$$

The sum in Equation 14 is the Fourier's series for $$\frac{\pi}{4}\left(0 < \frac{\omega T}{2c} < \pi\right)$$

The greater the value of $n$, the flatter is the power response with frequency. In the case of a length expander, as in Fig. 1, $\phi$ does not depend on T, but the same results can be achieved by making $|V_i|$ inversely proportional to $T_i$. Thus, in the case of a length expander, if one makes $T_i = iT$ ($i$ odd), that is $$T_1 = T, T_2 = 0, T_3 = 3T, \text{ etc.}$$

(T is length of transducer plate 13a, 13b, 13c, and 13d in Fig. 1) substituting Equation 4 in Equation 12, which is a constant (independent of frequency), Equation 12 becomes, if $$|V_i| = \frac{|V|}{i}$$

$$|i_L| \frac{2|V|}{Z_0 + Z_L} \frac{dw}{s^E} \sum_{i=1,3,\ldots}^{n} \frac{1}{i} \sin \frac{i\omega T}{2c} \quad (13)$$

From the foregoing it will be appreciated that by the present invention a great variety of output power with frequency response characteristics can be obtained, and a specific desired characteristic can be obtained by selecting an appropriate sequence of dimensions for the several active transducer elements in the sonic line. Also, in accordance with the present invention, it is considered that for most applications it will be preferred that the dimensions of the transducer elements be selected in accordance with the applied signals, to afford operation thereof at or near a resonant frequency, or that the transducer elements have resonant frequencies intermediate the limits of the band of applied signals. By this means innumerable output power with frequency response curves may be obtained, including a flat curve as one specific desirable curve.

An additional feature of the present invention resides in the fact that in the case of a single element transducer, by appropriately positioning the transducer element with respect to the load, at least one half of the radiated power from the transducer system can be obtained at the load. It is obvious that the absorber current $i_A$ corresponding to some particular transducer element depends on the distance of the element from the load and on the load impedance, for $i_A$ is the sum of the current radiated directly toward the load and that reflected therefrom. The absorber current $i_A$ can be shown to be defined by the equation $$i_A = \frac{2\phi V}{Z_0(Z_0+Z_L)} e^{-2i(\theta+\psi)} \sin \theta [Z_0 \sin(\theta+2\psi) - jZ_L \cos(\theta+2\psi)] \quad (14)$$

in the case of a single element transducer illustrated in Figs. 3 and 4. From Equation 5, the load current $i_L$ in this case has its maximum absolute value $|i_{L,0}|$ whenever $\theta$ is an odd multiple of $$\frac{\pi}{2}$$

At the midband points, the absorber current is from Equation 14

$$i_{A,0} = \frac{-2\phi V}{Z_0(Z_0+Z_L)}(Z_0 \cos 2\psi + jZ_L \sin 2\psi) \quad (15)$$

so that the power expended at the absorber at these points is $$P_{A,0} = |i_{A,0}|^2 Z_0 = \frac{4\phi^2 V^2}{Z_0(Z_0+Z_L)^2}(Z_0^2 \cos^2 2\psi + Z_L^2 \sin^2 2\psi) \quad (16)$$

while the power expended at the load is from Equation 5

$$P_{L,0} = |i_{L,0}|^2 Z_L = \frac{4\phi^2 V^2 Z_L}{(Z_0+Z_L)^2} \quad (17)$$

Equations 15 and 16 provide the relation $$\frac{P_{A,0}}{P_{L,0}} = \frac{Z_0^2 \cos^2 2\psi + Z_L^2 \sin^2 2\psi}{Z_0 Z_L} \quad (18)$$

for the ratio of power expended in the absorber to that in the load at midband. The minimum value (qua function of $\psi$) of the expression $$Z_0^2 \cos^2 2\psi + Z_L^2 \sin^2 2\psi$$

in Equation 17 is $Z_0^2$ or $Z_L^2$, whichever is smaller. Thus, if $Z_L > Z_0$, $\psi$ is chosen so that $\cos^2 2\psi = 1$, which from Equation 1 means that $d$ (see Fig. 3) is an even number of quarter wavelengths, and the relationship results that $$\frac{P_{A,0}}{P_{L,0}} = \frac{Z_0}{Z_L} < 1 \quad (19)$$

On the other hand, if $Z_L < Z_0$, $\psi$ is chosen so that $\sin^2 2\psi = 1$, which means that $d$ (see Fig. 3) is an odd number of quarter wavelengths, and the relationship results that $$\frac{P_{A,0}}{P_{L,0}} = \frac{Z_L}{Z_0} < 1$$

From the foregoing it is apparent that in an instance where the characteristic impedance of the sonic line $Z_0$ is less than the impedance of the load $Z_L$, by placing the transducer element a distance $d$ from the load equal to any even number of transducer midband quarter wavelengths from the load, at least one half the power radiated from the sonic line will appear in the load. And similarly, in an instance where the characteristic impedance of the sonic line $Z_0$ is greater than the impedance of the load $Z_L$, by placing the transducer element a distance $d$ from the load equal to any odd number of transducer midband quarter wavelengths from the load, at least one half the power radiated from the sonic line will appear in the load.

In the foregoing detailed description of the present invention, reference is had to certain specific structural features in order to facilitate a complete understanding of the invention. It is not, however, intended to limit the scope of the invention to such specific features, and it is understood that modifications, variations and equivalents thereof will be apparent to those skilled in the art. Accordingly, such structures as are embraced within the spirit and terms of the following claims are considered to be within the scope of the present invention.

We claim:

1. An electrical-sonic distributed transducer comprising an electrical delay line, a sonic delay line, one line having an input end, the other line having an output end, a plurality of electrical-sonic transducer elements individually sonically coupled into said sonic line and individually electrically coupled into said electrical line, with the sonic delay time along said sonic line between said elements being substantially equal to the electrical delay time along said electrical line between the same ones of said elements, and at least some of said elements having substantially different dimensions to provide substantially different resonant frequencies.

2. An electrical-sonic distributed transducer comprising an electrical delay line, a sonic delay line, one line having an input end, the other line having an output end, a plurality of electrical-sonic transducer elements individually sonically coupled into said sonic line in an orientation forming a distributed thickness expander, said elements also being individually electrically coupled into said electrical line, with the sonic delay time along said sonic line between said elements being substantially equal to the electrical delay time along said electrical line between the same ones of said elements, and at least some of said elements having substantially different dimensions to provide substantially different resonant frequencies.

3. An electrical-sonic distributed transducer comprising an electrical delay line, a sonic delay line, one line having an input end, the other line having an output end, a plurality of electrical-sonic transducer elements individually sonically coupled into said sonic line in an orientation forming a distributed length expander, said elements also being individually electrically coupled into said electrical line, with the sonic delay time along said sonic line between said elements being substantially equal to the electrical delay time along said electrical line between the same ones of said elements, and at least some of said elements having substantially different dimensions to provide substantially different resonant frequencies.

4. An electrical-sonic distributed transducer comprising an electrical delay line, a sonic delay line, one line having an input end, the other line having an output end, a plurality of electrical-sonic transducer elements individually sonically coupled into said sonic line and individually electrically coupled into said electrical line, with the sonic delay time along said sonic line between said elements being substantially equal to the electrical delay time along said electrical line between the same ones of said elements, at least some of said elements having different resonant frequencies, means for applying a signal input to said input end, said signal occupying a determined frequency band, and said elements having substantially different dimensions to provide substantially resonant frequencies intermediate the limits of said frequency band.

5. An electrical-sonic distributed transducer comprising an electrical delay line, a sonic delay line, one line having an input end, the other line having an output end, a plurality of electrical-sonic transducer elements individually sonically coupled into said sonic line in an orientation forming a distributed thickness expander, said elements also being individually electrically coupled into said electrical line, with the sonic delay time along said sonic line between said elements being substantially equal to the electrical delay time along said electrical line between the same ones of said elements, at least some of said elements having different resonant frequencies, means for applying a signal input to said input end, said signal occupying a determined frequency band, and said elements having substantially different dimensions to provide substantially resonant frequencies intermediate the limits of said frequency band.

6. An electrical-sonic distributed transducer comprising an electrical delay line, a sonic delay line, one line having an input end, the other line having an output end, a plurality of electrical-sonic transducer elements, individually sonically coupled into said sonic line in an orientation forming a distributed length expander, said elements also being individually electrically coupled into said electrical line, with the sonic delay time along said sonic line between said elements being substantially equal to the electrical delay time along said electrical line between the same ones of said elements, at least some of said elements having different resonant frequencies, means for applying a signal input to said input end, said signal occupying a determined frequency band, and said elements having substantially different dimensions to provide substantially resonant frequencies intermediate the limits of said frequency band.

7. An electrical-sonic distributed transducer comprising an electrical delay line, a sonic delay line, one line having an input end, the other line having an output end, a plurality of electrical-sonic transducer elements individually sonically coupled into said sonic line and individually electrically coupled into said electrical line, with the sonic delay time along said sonic line between said elements being substantially equal to the electrical delay time along said electrical line between the same ones of said elements, at least some of said elements having different resonant frequencies, and said last named elements having dimensions lengthwise of the sonic line bearing a ratio to each other of odd multiples of the smallest stated dimensions of the last named elements.

8. An electrical-sonic distributed transducer comprising an electrical delay line, a sonic delay line, one line having an input end, the other line having an output end, a plurality of electrical-sonic transducer elements individually sonically coupled into said sonic line and individually electrically coupled into said electrical line, with the sonic delay time along said sonic line between said elements being substantially equal to the electrical delay time along said electrical line between the same ones of said elements, at least some of said elements having different resonant frequencies, said last named elements having dimensions lengthwise of the sonic line bearing a ratio to each other forming a series of consecutive odd multiples of the smallest stated dimension of the last named elements.

9. An electrical-sonic transducer comprising a sonic delay line, an electrical-sonic transducer element sonically coupled into said delay line, an electrical line electrically coupled to said element, one line having a signal input at an end thereof and the other line having a signal output at an end thereof, said transducer element being located a distance from said end of said sonic delay line substantially equal to an integral multiple of a quarter wavelength of a midband frequency of said element.

10. An electrical-sonic transducer comprising a sonic delay line, an electrical-sonic transducer element sonically coupled into said delay line, an electrical line electrically coupled to said element, one line having a signal input at an end thereof and the other line having a signal output at an end thereof, said transducer element being located a distance from said end of said sonic delay line substantially equal to an integral odd multiple of a quarter wavelength of a midband frequency of said element.

11. An electrical-sonic transducer comprising a sonic delay line, an electrical-sonic transducer element sonically coupled into said delay line, an electrical line electrically coupled to said element, one line having a signal input at an end thereof and the other line having a signal output at an end thereof, said transducer element being located a distance from said end of said sonic delay line substantially equal to an integral even multiple of a quarter wavelength of a midband frequency of said element.

References Cited in the file of this patent

UNITED STATES PATENTS

| | | |
|---|---|---|
| 2,702,472 | Rabinow | Feb. 22, 1955 |
| 2,717,981 | Apstein | Sept. 13, 1955 |
| 2,806,155 | Rotkin | Sept. 10, 1957 |